United States Patent
Fu (10) Patent No.: US 11,416,151 B2
(45) Date of Patent: Aug. 16, 2022

(54) DATA STORAGE DEVICE WITH HIERARCHICAL MAPPING INFORMATION MANAGEMENT, AND NON-VOLATILE MEMORY CONTROL METHOD

(71) Applicant: Silicon Motion, Inc., Jhubei (TW)

(72) Inventor: Hsueh-Chun Fu, Hukou Township, Hsinchu County (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 17/112,027

(22) Filed: Dec. 4, 2020

(65) Prior Publication Data

US 2021/0208798 A1  Jul. 8, 2021

(30) Foreign Application Priority Data

Jan. 6, 2020 (TW) .................................. 109100257

(51) Int. Cl.
*G06F 3/06* (2006.01)

(52) U.S. Cl.
CPC .......... *G06F 3/0629* (2013.01); *G06F 3/0622* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | |
|---|---|---|
| 2005/0015378 A1 | 1/2005 | Gammel et al. |
| 2006/0282644 A1 | 12/2006 | Wong |
| 2017/0109089 A1 | 4/2017 | Huang |
| 2017/0235681 A1* | 8/2017 | Kaburaki ............ G06F 12/0292 711/128 |
| 2019/0188124 A1 | 6/2019 | Ferrante et al. |
| 2019/0236003 A1 | 8/2019 | Kanno |
| 2019/0286571 A1* | 9/2019 | Mori ................... G06F 12/1009 |

FOREIGN PATENT DOCUMENTS

| | | |
|---|---|---|
| CN | 108139902 A | 6/2018 |
| TW | 591385 B | 6/2004 |
| TW | 200710654 A | 3/2007 |

\* cited by examiner

*Primary Examiner* — Edward J Dudek, Jr.
*Assistant Examiner* — Ralph A Verderamo, III
(74) *Attorney, Agent, or Firm* — McClure, Qualey & Rodack, LLP (57) ABSTRACT

An efficient mapping information management technology for non-volatile memory is disclosed. When a host requests to access data of a first logical address, a microprocessor of a controller of the non-volatile memory loads a first sub-mapping table from the non-volatile memory to a volatile memory. The microprocessor loads hierarchical pointer tables related to the first logical address into the volatile memory. Among the hierarchical pointer tables, each higher-level pointer table lists non-volatile memory physical addresses of lower-level pointer tables. A non-volatile memory physical address of the first sub-mapping table is obtained from a first pointer table according to a first index, for the microprocessor to load the first sub-mapping table from the non-volatile memory into the volatile memory for mapping information of the first logical address, and the first pointer table is in the lowest level among the hierarchical pointer tables loaded in the volatile memory.

12 Claims, 9 Drawing Sheets

DATA STORAGE DEVICE WITH HIERARCHICAL MAPPING INFORMATION MANAGEMENT, AND NON-VOLATILE MEMORY CONTROL METHOD

CROSS REFERENCE TO RELATED APPLICATIONS

This Application claims priority of Taiwan Patent Applications No. 109100257, filed on Jan. 6, 2020, the entirety of which is incorporated by reference herein.

BACKGROUND OF THE INVENTION

Field of the Invention

The present invention is related to mapping information management of non-volatile memory.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on the special storage characteristics of non-volatile memory are developed.

BRIEF SUMMARY OF THE INVENTION

An efficient management technology for mapping information of non-volatile memory is shown.

A data storage device in accordance with an exemplary embodiment of the present invention has a non-volatile memory and a controller. The controller connects the host to the non-volatile memory. When the host requests to access data of a first logical address, the microprocessor loads a first sub-mapping table from the non-volatile memory to a volatile memory. The microprocessor loads hierarchical pointer tables related to the first logical address into the volatile memory. Among the hierarchical pointer tables, each higher-level pointer table lists non-volatile memory physical addresses of lower-level pointer tables. A non-volatile memory physical address of the first sub-mapping table is obtained from a first pointer table according to a first index, for the microprocessor to load the first sub-mapping table from the non-volatile memory into the volatile memory for mapping information of the first logical address. The first pointer table is in the lowest level among the hierarchical pointer tables loaded in the volatile memory.

In an exemplary embodiment, when the host requests to access data of a second logical address related to a second sub-mapping table and a non-volatile memory physical address of the second sub-mapping table is stored in the first pointer table as indicated by a second index, the microprocessor looks up the first pointer table according to the second index to obtain the non-volatile memory physical address of the second sub-mapping table and, accordingly, the microprocessor loads the second sub-mapping table from the non-volatile memory into the volatile memory for mapping information of the second logical address.

In an exemplary embodiment, a non-volatile memory physical address of the first pointer table is recorded in a second pointer table as indicated by a third index. When the host requests to access data of a third logical address related to a third sub-mapping table, a non-volatile memory physical address of the third sub-mapping table is stored in a third pointer table as indicated by a fourth index, and a non-volatile memory physical address of the third pointer table is stored in the second pointer table as indicated by a fifth index, the microprocessor looks up the second pointer table loaded in the volatile memory according to the fifth index to obtain the non-volatile memory physical address of the third pointer table, loads the third pointer table from the non-volatile memory into the volatile memory, looks up the third pointer table loaded in the volatile memory according to the fourth index, and obtains the non-volatile memory physical address of the third sub-mapping table to load the third sub-mapping table from the non-volatile memory into the volatile memory for mapping information of the third logical address.

In an exemplary embodiment, during the power-up of the data storage device, the microprocessor loads a fourth pointer table from the non-volatile memory into the volatile memory and then the fourth pointer table resides in the volatile memory. The fourth pointer table is in the highest level among the hierarchical pointer tables.

In an exemplary embodiment, the first logical address, the second logical address, and the third logical address are represented by a logical address format. An index to look up the fourth pointer table is formed by bits in a first section of the logical address format. An index to look up the second pointer table is formed by bits in a second section of the logical address format. An index to look up the first pointer table or the third pointer table is formed by bits in a third section of the logical address format. An index to look up the first sub-mapping table, the second sub-mapping table, or the third sub-mapping table is formed by bits in a fourth section of the logical address format.

In an exemplary embodiment, the microprocessor uses current values represented in the first section, the second section, and the third section of the logical address format to update a history search record in the volatile memory, for identification of a sub-mapping table loaded into the volatile memory.

The aforementioned controller may be implemented in other architectures. The foregoing concept can be used to implement a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RANI, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs). Every 512B data may be indicated by one LBA. Eight consecutive LBAs (4 KB data) may correspond to one host logical address HAddr. Mapping information that maps LBAs (or HAddrs) to physical addresses of flash memory is managed to show where the data indicated by the LBA or host logical address HAddr are actually stored in the physical space of flash memory.

Figure 1:
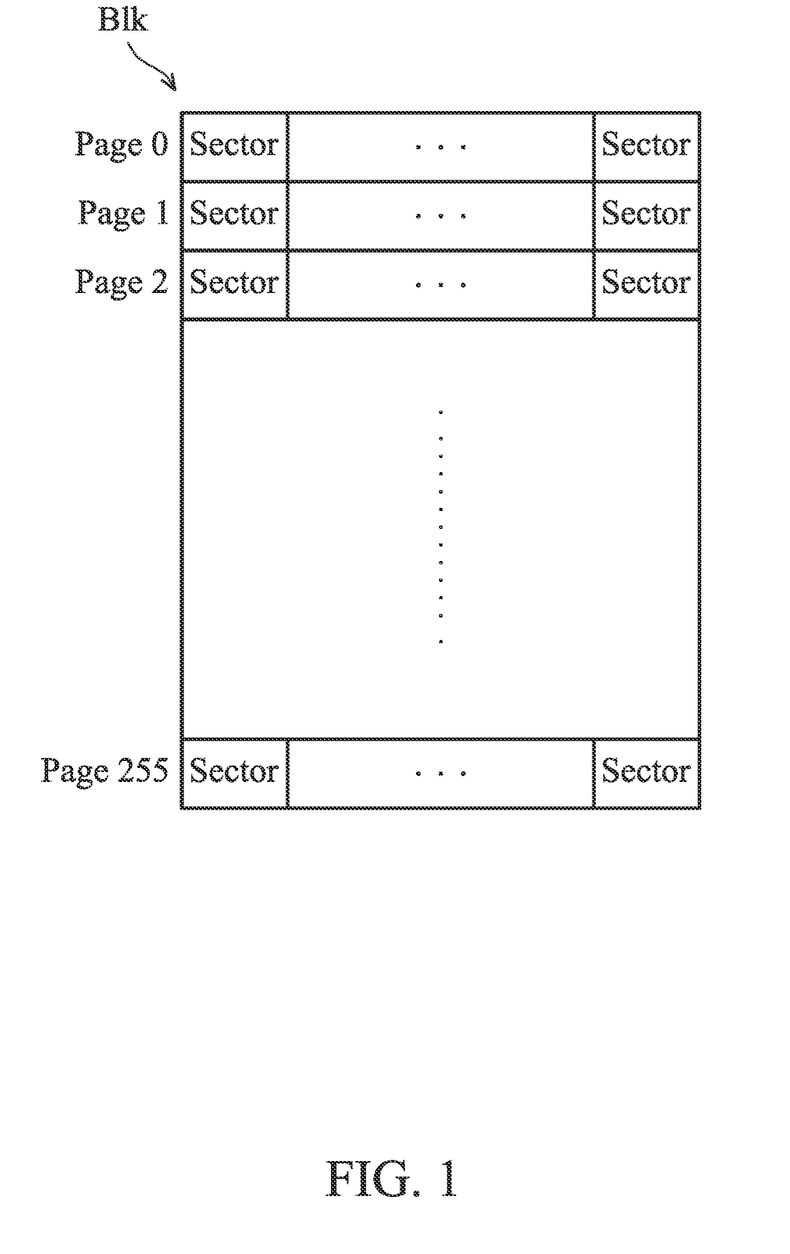
FIG. 1 illustrates the architecture of one block BLK.

The physical space of flash memory is divided into a plurality of blocks. FIG. 1 illustrates the architecture of one block BLK, which includes a plurality of pages (e.g., page 0 to page 255). Each page may be further divided into a plurality of sectors (e.g., 32 sectors). For example, each page may store 16 KB user data, and each sector may store 512B user data. In an exemplary embodiment, the data management unit is 4 KB. Four data units may be stored in one 16 KB page. Specifically, the four data units stored in the same page may be discontinuous in logical. The space allocation of flash memory is very complex.

In particular, the updated data is not overwritten on the storage space of the old data. The new version of the data must be written to a spare space and the old data is invalidated. This also makes the space allocation of the flash memory complicated.

The storage space of flash memory needs to be erased before being used again. The spare blocks are gradually consumed. When the spare blocks is insufficient (for example, less than a threshold amount), a garbage collection demand occurs. Sporadic valid data in a block is collected into another block through garbage collection. Blocks with only invalid data remained is erased to be released as a spare block, and so that the number of spare blocks is increased to ensure the normal use of the data storage device. Garbage collection, however, may further complicate the storage allocation of flash memory.

As can be seen from the foregoing, it is important to monitor the space allocation of flash memory. In an exemplary embodiment, a logical-to-physical address mapping (L2P) table is established to map LBAs (or host logical addresses HAddrs) to physical addresses of flash memory. In an exemplary embodiment, mapping data for every 8 LBAs is 4 B.

However, as the manufacturing process progresses, the size of flash memory is getting larger and larger. A 4 TB flash memory may require a 4 GB L2P table. A 8 TB flash memory may require a 8 GB L2P table. An excessively large L2P table is not easy to maintain. On the other hand, in some designs, the data storage device is not equipped with any DRAM and only has a 512B SRAM for the temporary storage of mapping information. How to manage the huge LLP table by such a limited temporary storage device to effectively access and update mapping information becomes an important technical issue.

Figure 2:
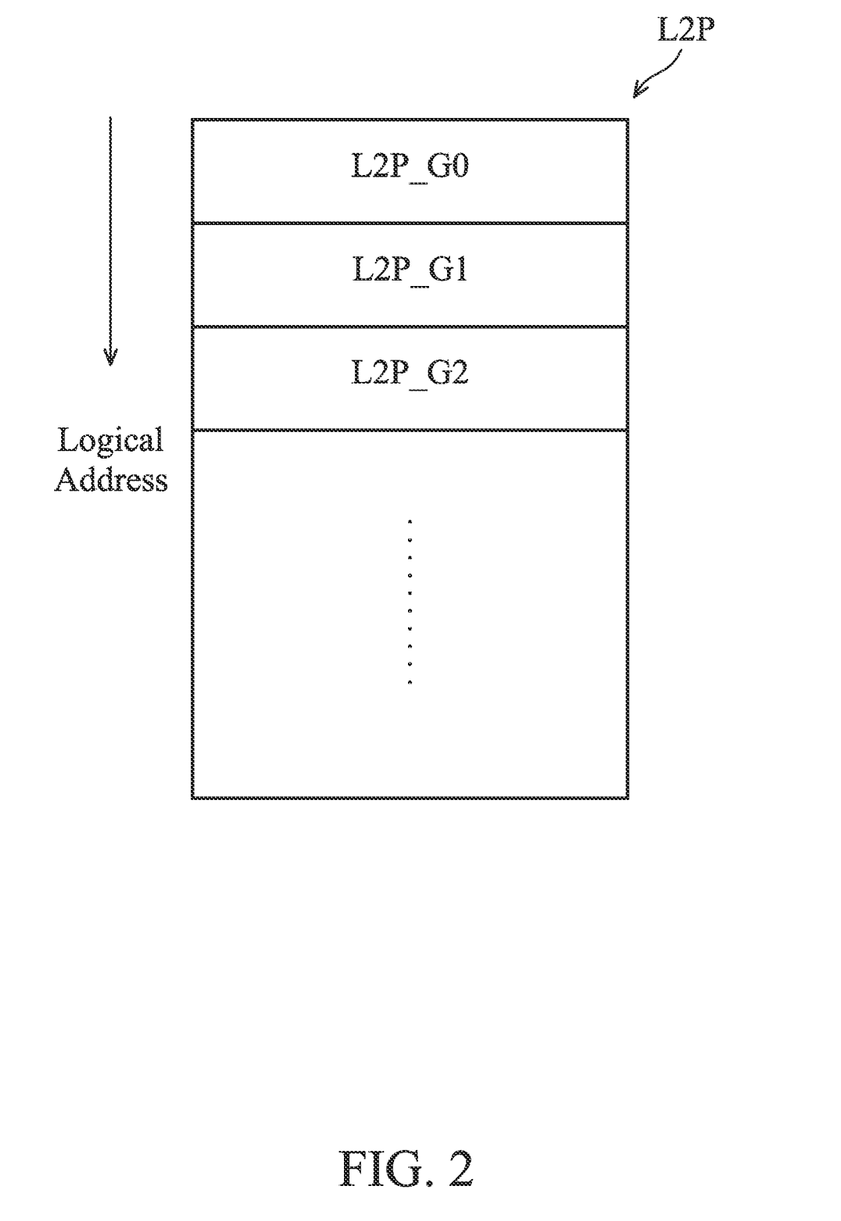
FIG. 2 illustrates the definition of sub-mapping tables L2P_G #.

A hierarchical mapping information management technology is proposed in the present invention. First, the L2P table is divided into a plurality of sub-mapping tables L2P_G # to correspond to the different logical address groups G # (11 is a number). Only the target sub-mapping table L2P_G # is loaded into the SRAM as a reference or to be updated. Compared to loading the complete L2P table, it is much easier to load only the target sub-mapping table L2P_G #. FIG. 2 illustrates the definition of sub-mapping tables L2P_G #. In an exemplary embodiment, the L2P table is divided into sub-mapping tables L2P_G # according to a particular logical address length. In an exemplary embodiment, each group relates to 16 K host logical addresses HAddrs. The flash memory physical addresses mapped to the host logical addresses HAddr0~HAddr16383 may be recorded in the sub-mapping table L2P_G0, the flash memory physical addresses mapped to the host logical addresses HAddr16384 HAddr32767 may be recorded in the sub-mapping table L2P_G1, and so on. Each record of physical address may be 4 B, and so that each sub-mapping table L2P_G # is 64 KB. A 4 TB flash memory requires 64 K sub-mapping tables L2P_G0 . . . L2P_G65535. The total size of the 64 K sub-mapping tables L2P_G0, . . . L2P_G65535 is 4 GB.

In particular, hierarchical pointer tables are proposed to manage the pointers pointing to the sub-mapping tables L2P_G #. In an N-level hierarchical architecture, the highest-level pointer table (root table) is named L0_PT. From high to low level, the level number is gradually increased. The lowest-level pointer table is named L(N−1)_PT #. The size of the highest-level pointer table L0_PT is relatively small, 16 B, and can reside in the SRAM. When operating non-volatile memory, it is convenient to look up the highest-level pointer table L0_PT to load the required pointer tables L1_PT # . . . L(N−1) PT # (from the second highest-level to the lowest level) from the non-volatile memory to the SRAM. Based on the lowest-level pointer table L(N−1)_PT # loaded into the volatile memory, the target sub-mapping table L2P_G # is loaded from the non-volatile memory to the SRAM. Due to the hierarchical architecture, the loaded pointer tables from the highest level to the lowest level (L0_PT to L(N−1)_PT #) only occupy a limited SRAM space. The larger the data storage device is, the more effective the hierarchical architecture will be.

In an exemplary embodiment, N is 2. The highest-level pointer table L0_PT points to a plurality of second highest-level pointer tables (i.e., the lowest-level pointer tables) L1_PT #. Each of the lowest-level pointer table L1_PT # records pointers pointing to a plurality of sub-mapping tables L2P_G #.

Figure 3:
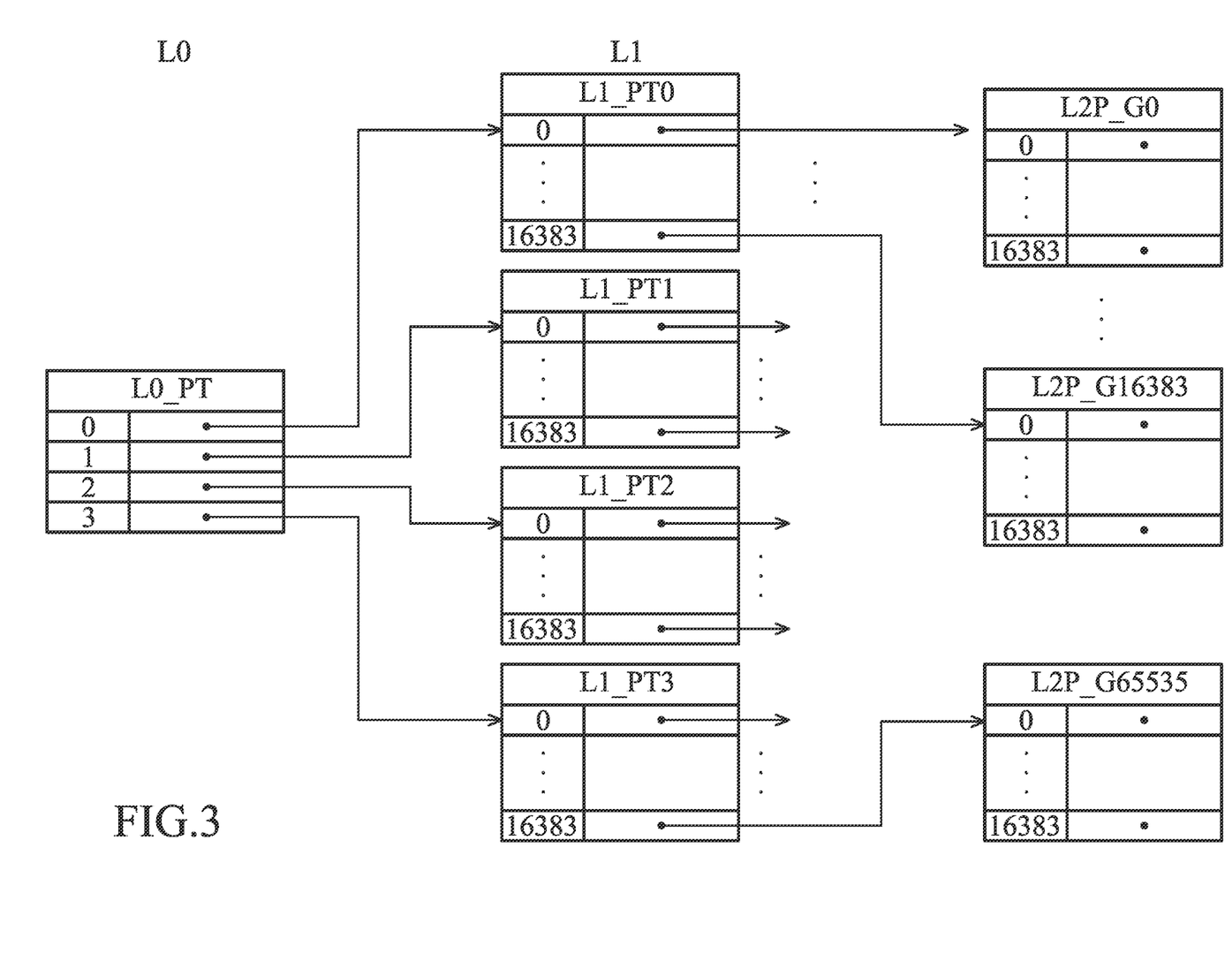
FIG. 3 illustrates the hierarchical architecture for managing the pointers pointing to the sub-mapping tables L2P_G0 . . . L2P_G65535 in accordance with an exemplary embodiment of the present invention.

FIG. 3 illustrates the hierarchical architecture for managing the pointers pointing to the sub-mapping tables L2P_G0 . . . L2P_G65535 in accordance with an exemplary embodiment of the present invention. The hierarchical pointer tables are stored in the flash memory for non-volatile storage. In FIG. 3, there are 2 hierarchical levels. FIG. 3 illustrates one highest-level pointer table L0_PT and four lowest-level pointer tables L1_PT #. The highest-level pointer table L0_PT only has four entries indexed from 0 to 3. Each entry is 4 B in size. The physical addresses that the flash memory stores the lowest-level pointer tables L1_PT0 to L1_PT3 are recorded in the highest-level pointer table L0_PT. The size of the highest-level pointer table L0_PPT is 16 B (=4*4 B). The lowest-level pointer tables L1_PT # each includes 16384 entries indexed from 0 to 16383. Each entry-provides a 4 B space to record the physical address that the flash memory stores one sub-mapping mapping table L2P_G #. Each lowest-level pointer table L1_PT #, therefore, is 64 KB (=1.6 K*4 B). The 65536 sub-mapping table L2P_G # are divided into four groups and managed by four lowest-level pointer tables L1_PT #. When operating the data storage device, the controller of the data storage device does not need to load all of the four lowest-level pointer table (256 KB) to the SRAM. Only one lowest-level pointer table L1_PT # (64 KB) is loaded into the SRAM. The usage of SRAM space is effectively reduced by three-quarters.

In an exemplary embodiment, the data storage device only includes a small SRAM (e.g., only 256 KB). The present invention can work well on such a small SRAM. Only 144 KB (=16 B+64 KB+64 KB) SRAM space is required to get the target sub-mapping table L2P_G #. The highest-level pointer table L0_PT residing in the SRAM occupies 16 B. The lowest-level pointer table L1_PT # loaded into the SRAM according to L0_PT occupies 64 KB. The target group table mapping table L2P_G # loaded into the SRAM according to loaded L1_PT # occupies 64 KB, Based on the hierarchical architecture managing the pointers of sub-mapping tables L2P_G4, a small SRAM is enough for operating a non-volatile memory.

Figure 4:
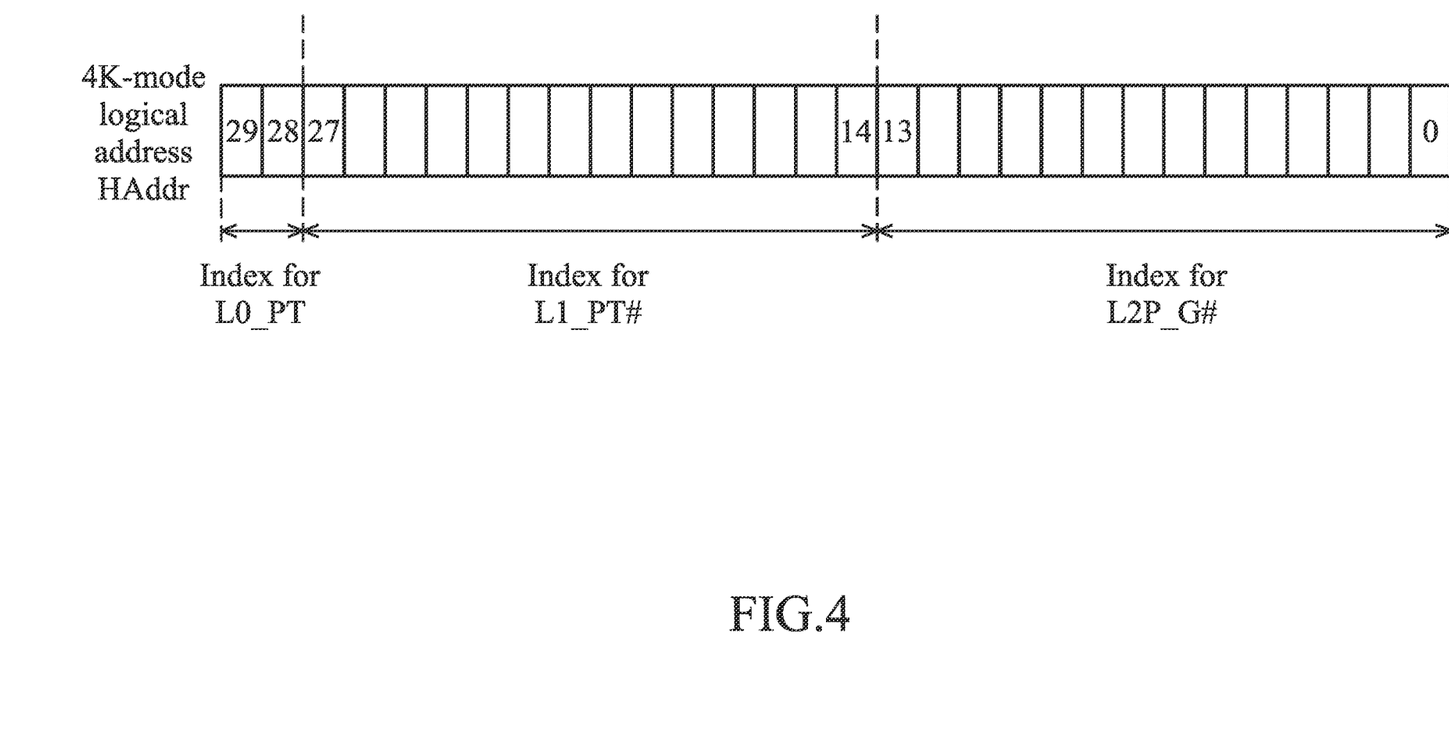
FIG. 4 illustrates the format of host logical address HAddr, which requires 30 bits.

FIG. 4 illustrates the format of host logical address HAddr, which requires 30 bits. Corresponding to the hierarchical architecture depicted in FIG. 3, bits 29 and 28 of host logical address HAddr form an index for searching the highest-level pointer table L0_PT to read one entry of the highest-level pointer table L0_PT. For example, when HAddr[29:28] is "01", the number 1 entry of the highest-level pointer table L0_PT is read and the physical address of the lowest-level pointer table L1_PT1 in the flash memory is Obtained. The lowest-level pointer table L1_PT1 may be searched according to an index formed by bits 27 to 14 of host logical address HAddr. When HAddr[27:14] is "00, 0000,0000,0100", the number 4 entry of the lowest-level pointer table L1_PT1 is read and the physical address of the sub-mapping table L2P_G163488 in the flash memory is obtained. The sub-mapping table L2P_G163488 may be searched according to an index formed by bits 13 to 0 of host logical address HAddr. When HAddr[13:0] is "00,0000, 0000,1000", the number 8 entry of the sub-mapping table LP2_G163488 is read and the physical address of the data identified by the host logical address HAddr in the flash memory is obtained. The highest-level pointer table L0_PT resides in SRAM in default. The controller of the data storage device can obtain the required lowest-level pointer table L1_PT # according to the host logical address HAddr and the highest-level pointer table L0_PT. Then, based on the obtained lowest-level pointer table L1_PT # and the host logical address HAddr, the controller obtains the target sub-mapping table L2P_G #. Based on the target sub-mapping table L2P_G # and the host logical address HAddr, the controller finally obtains the flash memory physical address of the user data indicated by the host logical address HAddr. As for user data update, the data storage device can load the target sub-mapping table L2P_G # according to the forgoing steps to update the flash memory physical address of the user data indicated by the host logical address HAddr.

Figure 5:
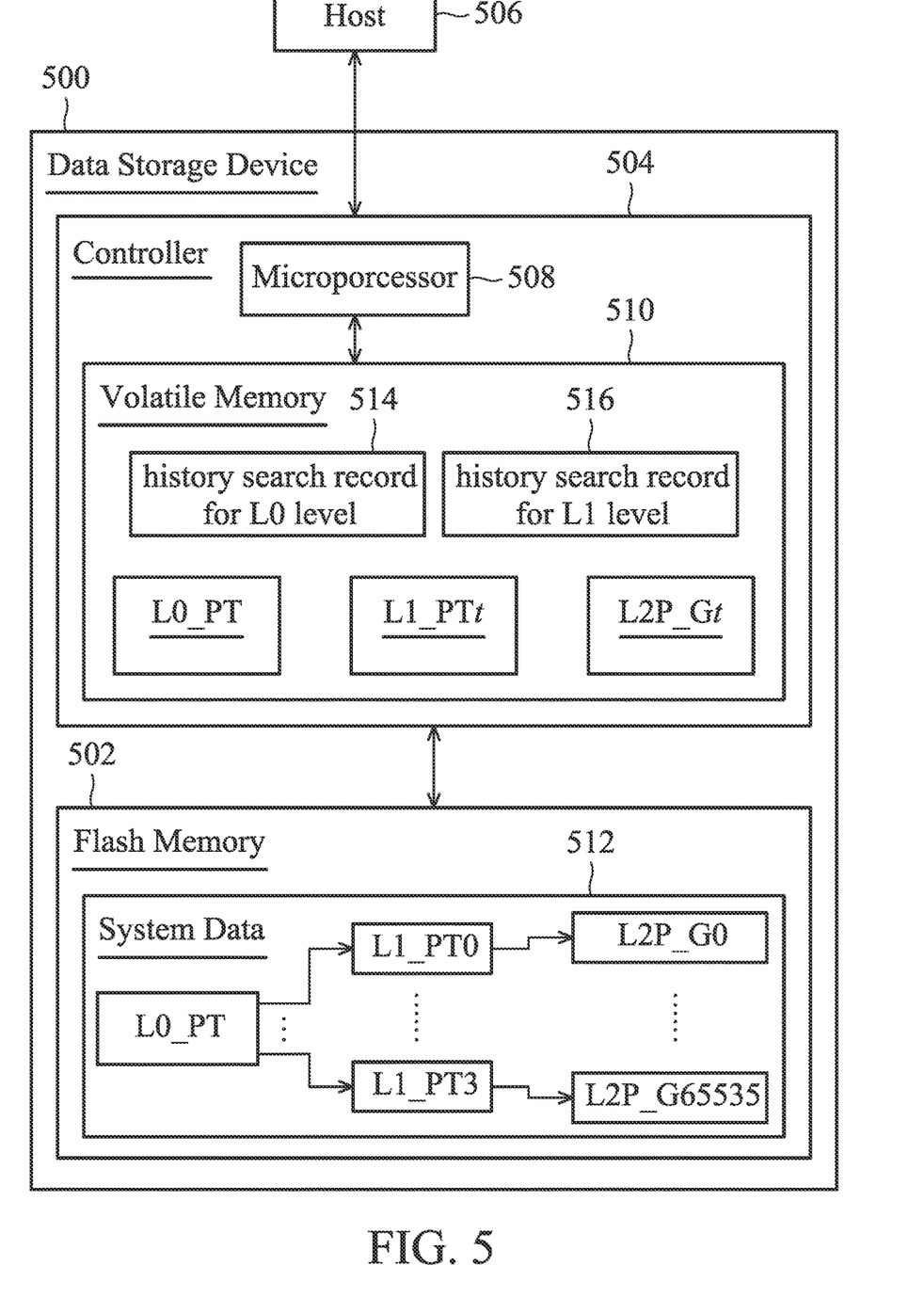
FIG. 5 illustrates a data storage device 500 in accordance with an exemplary embodiment of the present invention.

FIG. 5 illustrates a data storage device 500 in accordance with an exemplary embodiment of the present invention, in which a flash memory 502 is used as a storage medium, and a controller 504 is provided. The host 506 reads and writes the flash memory 502 through the controller 504.

The controller 504 includes a microprocessor 508 and a volatile memory 510. When a host 506 requests to read or write user data of a host logical address HAddr, the microprocessor 508 loads the required mapping information into the volatile memory 510. The volatile memory 510 may be a static random access memory (SRAM), a dynamic random access memory (DRAM) . . . etc. In other exemplary embodiments, the system memory (such as a system DRAM) in the host 506 can also be used as the volatile memory for temporary information storage.

In addition to user data (not shown in the figure), the flash memory 502 also stores system data 512. The system data 512 includes all the tables in FIG. 3, including: the highest-level pointer table L0_PT, all lowest-level pointer tables L1_PT #, and all sub-mapping tables L2P_G #. When the data storage device 500 is powered up, the microprocessor 508 loads the highest-level pointer table L0_PT from the flash memory 502 into the volatile memory 510. Based on the highest-level pointer table L0_PT residing in the volatile memory 510 and the host logical address HAddr requested by the host 506, the microprocessor 508 reads the required lowest-level pointer table L1_PT # and the target sub-mapping table L2P_G # from the flash memory 502.

When the host 506 requests to access data of a logical address HAddr, the microprocessor 508 combines bit 29 and bit 28 of the logical address HAddr to form an index HAddr[29:28]. If the index HAddr[29:28] has been recorded in the volatile memory 510 as a history search record 514 for the highest-level (L0) pointer table, it means that the requested lowest-level (L1) pointer table L1_PTt has been loaded into the volatile memory 510.

Next, the microprocessor 508 combines bits 27 to 14 of the logical address HAddr to form an index HAddr[27:14]. If the index HAddr[27:14] has been recorded in the volatile memory 510 as a history search record 516 for the lowest-level (L1) pointer table, it means that the target sub-mapping table L2P_G1 has been loaded into the volatile memory 510.

Then, the microprocessor 508 combines bits 13 to 0 of the logical address HAddr to form an index HAddr[13:0] to look up the target sub-mapping table L2P_Gt and thereby obtains the mapping information (e.g., a physical address of the flash memory 502) of the logical address HAddr. In response to a read request from the host 506, the user data requested by the host 506 can be successfully read from the flash memory 502 according to the mapping information and then returned to the host 506. In response to a write request from the host 506, the target sub-mapping table L2P_Gt is updated to record the new mapping information of the logical address HAddr in the entry indicated by the index HAddr[13:0].

If the history search record 514 recorded in the volatile memory 510 for the highest-level (L0) pointer table matches the index HAddr[29:28] but the history search record 516 recorded in the volatile memory 510 for the lowest-level (L1) pointer table does not match the index HAddr[27:14], the microprocessor 508 operates as follows. According to the index HAddr[27:14], the microprocessor 508 looks up the lowest-level (L1) pointer table L1_PTt already loaded into the volatile memory 510, and obtains a physical address that the flash memory 502 stores the target sub-mapping table L2P_Gt. According to the Obtained physical address, the microprocessor 508 loads the target sub-mapping table L2P_Gt from the flash memory 502 into the volatile memory 510. The microprocessor 508 updates the history search record 516 of the lowest-level (L1) pointer table to the value of the index HAddr[27:14].

If the history search record 514 recorded in the volatile memory 510 for the highest-level (L0) pointer table does not match the index HAddr[29:28], the microprocessor 508 operates as follows. According to the index HAddr[29:28], the microprocessor 508 looks up the highest-level (L0) pointer table L0_PT residing in the volatile memory 510, and obtains a physical address that the flash memory 502 stores the requested lowest-level (L1) pointer table L1_PTt. According to the obtained physical address, the microprocessor 508 loads the requested lowest-level (L1) pointer table L1_PTt from the flash memory 502 into the volatile memory 510. The microprocessor 508 updates the history search record 514 of the highest-level (L0) pointer table to the value of index HAddr[29:28]. Then, according to the index HAddr[27:14], the microprocessor 508 looks up the lowest-level (L1) pointer table L1_PTt already loaded into the volatile memory 510, and obtains a physical address that the flash memory 502 stores the target sub-mapping table L2P_Gt. According to the obtained physical address, the microprocessor 508 loads the target sub-mapping table L2P_Gt from the flash memory 502 into the volatile memory 510. The microprocessor 508 updates the history search record 516 of the lowest-level (L1) pointer table to the value of the index HAddr[27:14].

Figure 6A:
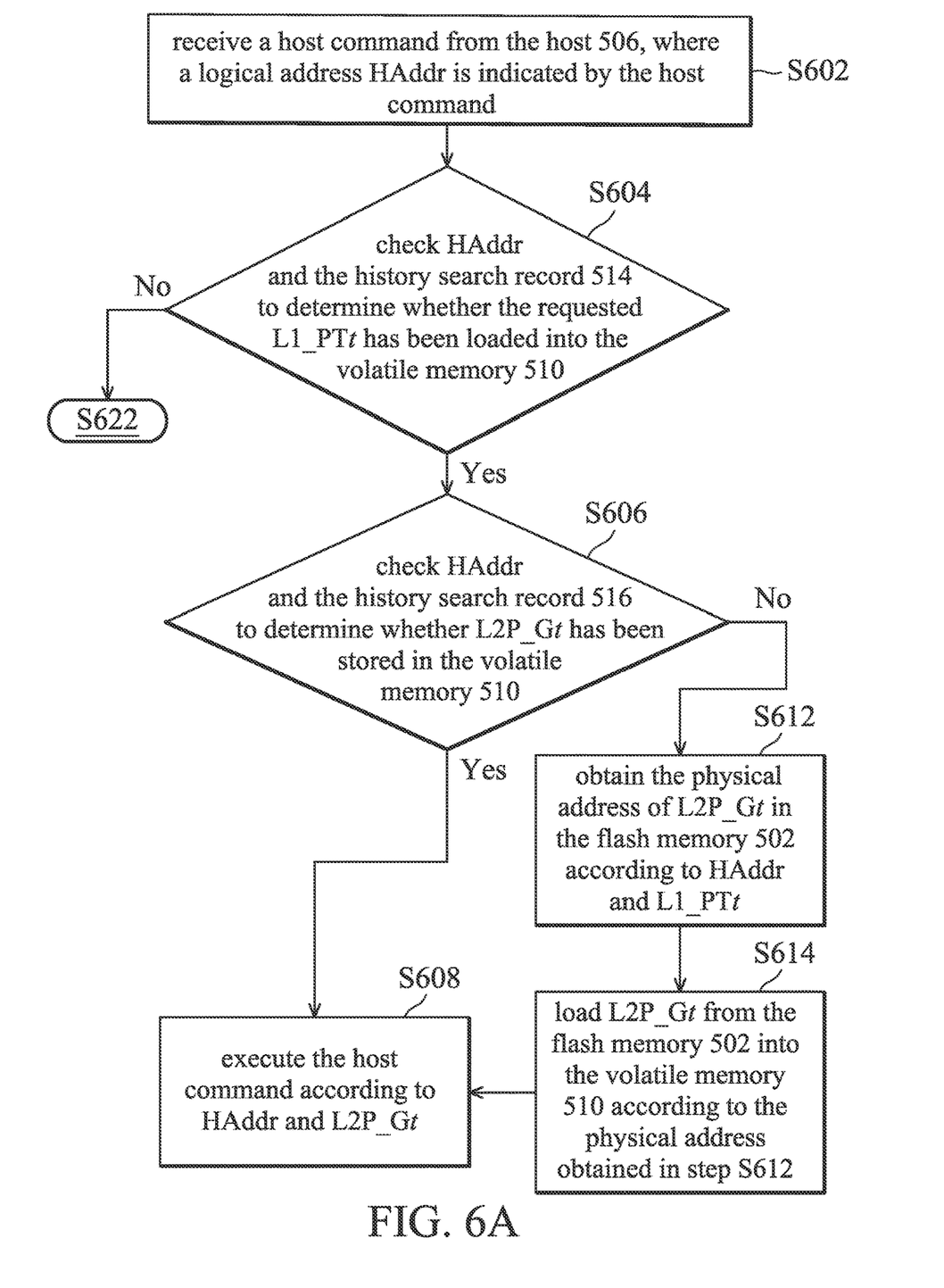
FIGS. 6A and 6B illustrate a flowchart regarding how to manage mapping information in volatile memory 510 in response to an access request issued by the host 506 in accordance with an exemplary embodiment of the present invention.
Figure 6B:
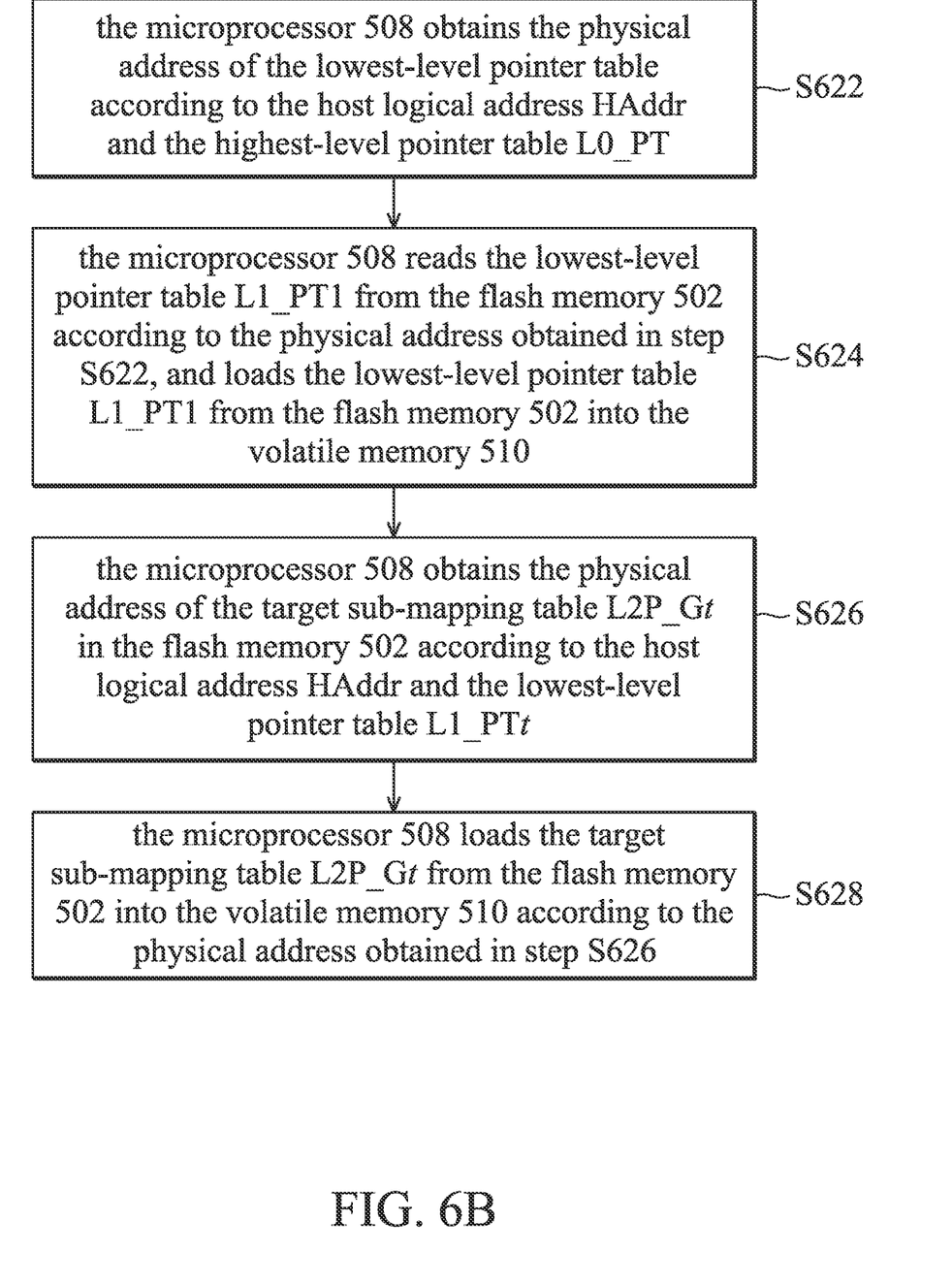

FIGS. 6A and 6B illustrate a flowchart regarding how to manage mapping information in the volatile memory 510 in response to an access request issued by the host 506 in accordance with an exemplary embodiment of the present invention.

In step S602, the microprocessor 508 receives a host command from the host 506, where a logical address HAddr is indicated by the host command.

In step S604, the microprocessor 508 checks the host logical address HAddr and the history search record 514 to determine whether the requested lowest-level pointer table L1_PTt has been loaded into the volatile memory 510. If yes, step S606 is performed. For example, if HAddr[29:28] is "01", the microprocessor 508 determines whether the requested lowest-level pointer table L1_PT1 indicated by the pointer recorded in entry 1 of the highest-level pointer table L0_PT has been stored in the volatile memory 510. The microprocessor 508 may record the table number # of the lowest-level pointer table L1_PT # currently stored in the volatile memory 510 as the history search record 514 to help the judgment of step S604.

In step S606, the microprocessor 508 checks the host logical address HAddr and the history search record 516 to determine whether the target sub-mapping table L2P_Gt has been stored in the volatile memory 510. If yes, step S608 is performed. Otherwise, step S612 is performed. For example, if HAddr[27:14] is "00,0000,0000,0100", the microprocessor 508 determines whether the target sub-mapping table L2P_G163488 indicated by the pointer recorded in entry 4 of the lowest-level pointer table L1_PT1 has been stored in the volatile memory 510. The microprocessor 508 may record the index that was used to search the lowest-level pointer table L1_PT # to get the sub mapping table L2P_G # currently stored in the volatile memory 510 as the history search record 516 to help the judgment of step S606.

In step S608, the microprocessor 508 executes the host command according to the host logical address HAddr and the target sub-mapping table L2P_Gt. For example, if the host command is a read command and HAddr[13:0] is "00,0000,0000,1000", the microprocessor 508 reads entry 8 of the target sub-mapping table L2P_G163488 to get a physical address of the requested user data in the flash memory 502, reads the user data from the flash memory 502, and returns the user data to the host 506. If the host command is a write command and HAddr[13:0] is "00,0000, 0000,1000", the microprocessor 508 writes the user data indicated by the write command to the flash memory 502 according to a new physical address assigned to the user data, and updates entry 8 of the target sub-mapping table L2P_G163488 to the new physical address.

In step S612, the microprocessor 508 obtains the physical address of the target sub-mapping table L2P_Gt in the flash memory 502 according to the host logical address HAddr and the lowest-level pointer table L1_PTt. For example, if HAddr[27:14] is "00,0000,0000,0100", the microprocessor 508 reads the entry 4 of the lowest-level pointer table L1_PT #1 to obtain the physical address of the target sub-mapping table L2P_G163488 in the flash memory 502.

In step S614, the microprocessor 508 loads the target sub-mapping table L2P_Gt from the flash memory 502 into the volatile memory 510 according to the physical address obtained in step S612. For example, the microprocessor 508 loads the target sub-mapping table L2P_G163488 from the flash memory 502 into the volatile memory 510 according to the physical address obtained in step S612. After step S614, the flow proceeds to step S608.

In step S622, the microprocessor 508 obtains the physical address of the lowest-level pointer table according to the host logical address HAddr and the highest-level pointer table L0_PT. For example, if HAddr[29:28] is "01", a physical address of the flash memory 502 recorded in entry 1 of the highest-level pointer table L0_PT (which is the physical address of the lowest-level pointer table L1_PT1 in the flash memory 502) is obtained for the flash memory 502 searching in the next step.

In step S624, the microprocessor 508 reads the lowest-level pointer table L1_PT1 from the flash memory 502 according to the physical address obtained in step S622, and loads the lowest-level pointer table L1_PT1 from the flash memory 502 into the volatile memory 510.

In step S626, the microprocessor 508 obtains the physical address of the target sub-mapping table L2P_Gt in the flash memory 502 according to the host logical address HAddr and the lowest-level pointer table L1_PTt. For example, if HAddr[27:14] is "00,0000,0000,0100", the microprocessor 508 reads entry 4 of the lowest-level pointe table L1_PT1 to obtain a physical address.

In step S628, according to the physical address obtained in step S626, the microprocessor 508 loads the target sub-mapping table L2P_Gt from the flash memory 502 into the volatile memory 510. For example, the microprocessor 508 reads the flash memory 502 according to the physical address obtained in step S626 and thereby obtains the target sub-mapping table L2P_G163488, and loads the target sub-mapping table L2P_G163488 into the volatile memory 510. Then, the procedure proceeds to step S608.

The forgoing hierarchical mapping information management technology is not limited to just two levels. For a flash memory with a larger capacity, more levels are used, and N is greater than 2. For example, to cope with a larger flash memory, the host logical address HAddr may be 32 bits or even 64 bits, and the level number N may be greater.

Figure 7A:
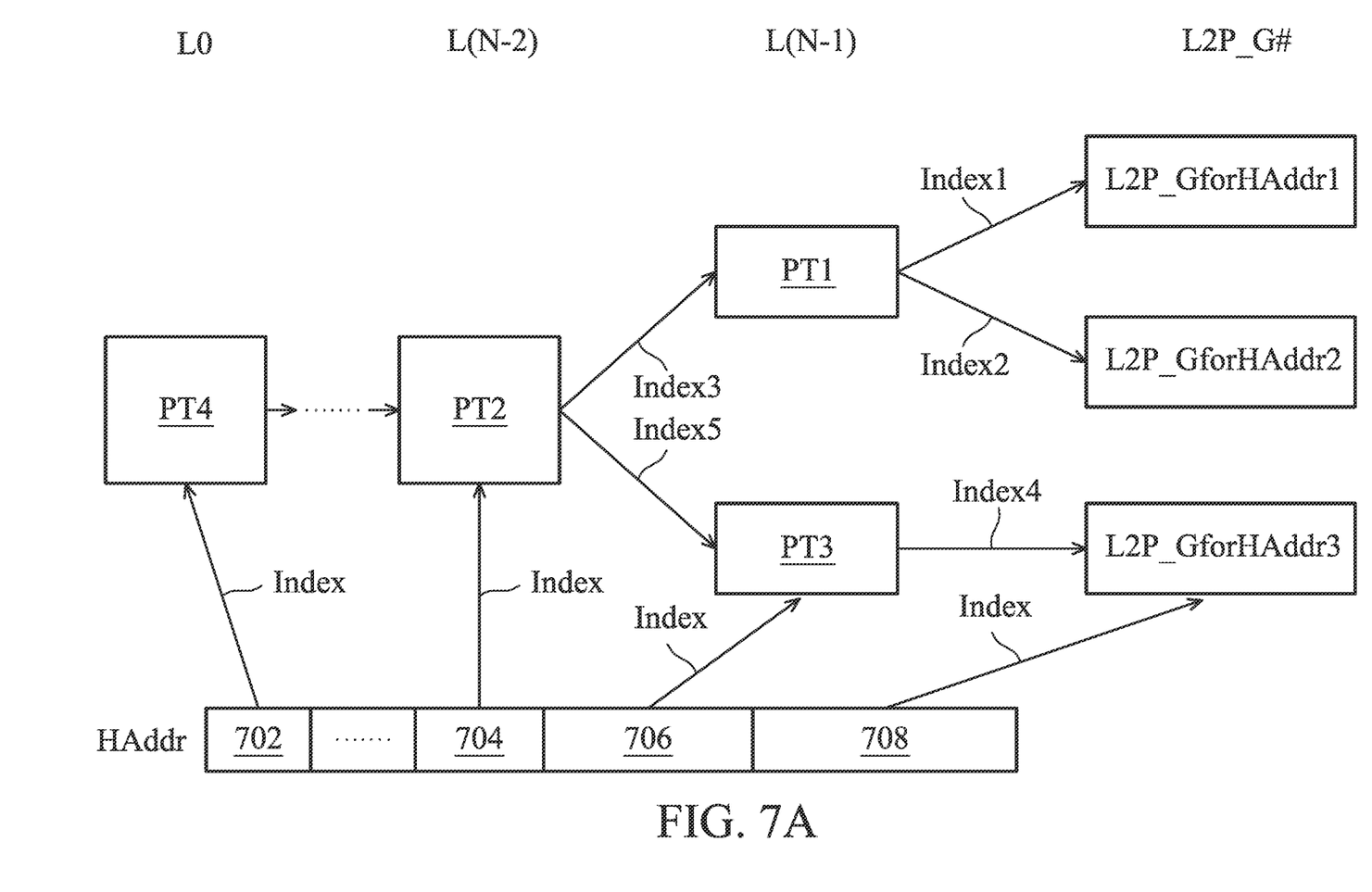
FIGS. 7A and 7B depict an N-level hierarchical mapping information management technology in accordance with an exemplary embodiment of the present invention, wherein N is greater than 2.
Figure 7B:
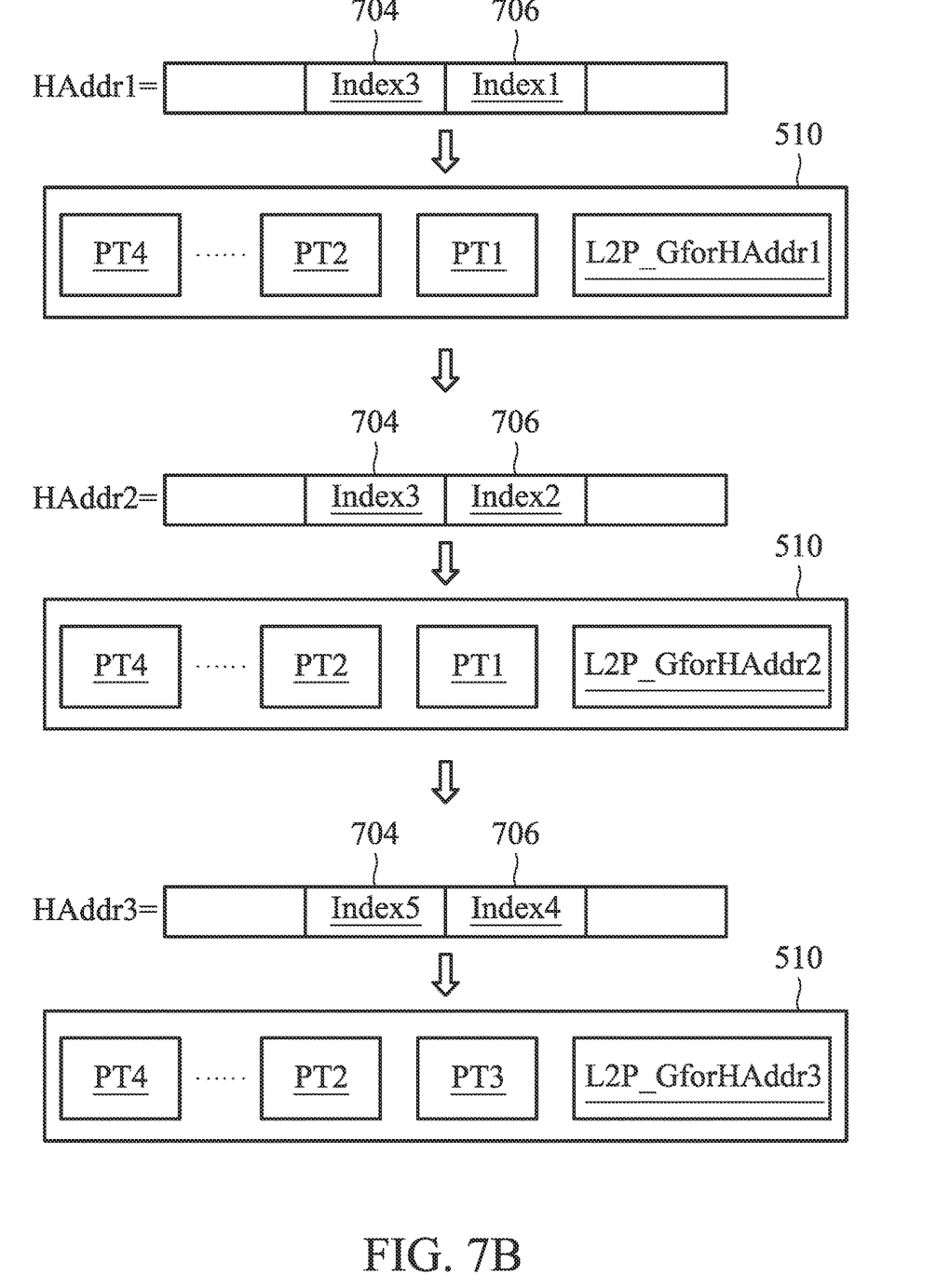

FIGS. 7A and 7B depict an N-level hierarchical mapping information management technology in accordance with an exemplary embodiment of the present invention, wherein N is greater than 2. The host requests to operate the non-volatile memory to access data of host logical addresses HAddr1, HAddr2, and HAddr3, which belong to three different logical address groups.

FIG. 7A shows how the host logical address HAddr1, HAddr2, and HAddr3 are related to the N-level hierarchical mapping information management architecture stored in the flash memory 502. The physical address of a sub-mapping table L2P_GforHAddr1 stored in the flash memory 502 related to the host logical address HAddr1 is recorded in the pointer table P1 (which is in the lowest level L(N−1) of the N-level hierarchical pointer tables) according to an index Index1. The physical address of a sub-mapping table L2P_GforHAddr2 stored in the flash memory 502 related to the host logical address HAddr2 is recorded in the pointer table PT1 according to an index Index2. The physical address of the pointer table PT1 stored in the flash memory 502 is recorded in another pointer table PT2 (which is in the second lowest level L(N−2) of the N-level hierarchical pointer tables) according to an index Index3. The physical address of a sub-mapping table L2P_GforHAddr3 stored in the flash memory 502 related to the host logical address HAddr3 is recorded in another pointer table PT3 (which is in the lowest level L(N−1) of N-level hierarchical pointer tables) according to an index Index4. The physical address of the pointer table PT3 stored in the flash memory 502 is recorded in the pointer table PT2 according to an index Index5. In the highest level L0 of the N-level hierarchical pointer tables, there only has one single pointer table PT4.

The binary representation of the host logical address HAddr is divided into (N+1) sections, wherein the first N sections correspond to the N hierarchical levels. The bits in the section 702 form an index for looking up the highest-level (L0) pointer table PT4. The bits in the section 704 form an index for looking up the second lowest level (L(N−2)) pointer table PT2. The bits in the section 706 form an index for looking up the lowest-level (L(N−1)) pointer table PT1 or PT3. The bits in the section 708 form an index for looking up the target sub-mapping table L2P_G #(e.g., L2P_GforHAddr1~L2P_GforHAddr3).

FIG. 7B shows how the tables are loaded into the volatile memory 510 in response to the accessing requests of host logical addresses HAddr1, HAddr2, and HAddr3. In this example, the highest-level (L0) pointer table PT4 resides in the volatile memory 510, and the second lowest level (L(N−2)) pointer table PT2 has been stored in the volatile memory 510.

When the host 506 requests to access the data of the host logical address HAddr1, the microprocessor 508 looks up the pointer table PT2 already stored in the volatile memory 510 according to an index value, Index3, formed by the bits in the section 704 of HAddr1, and thereby obtains a physical address from the pointer table PT2. According to the obtained physical address, the microprocessor 508 loads the pointer table PT1 from the flash memory 502 into the volatile memory 510. According to an index value, Index1, formed by the bits within the section 706 of HAddr1, the microprocessor 508 looks up the pointer table PT1 and thereby obtains a physical address. Based on the obtained physical address, the microprocessor 508 loads the sub-mapping table L2P_GforAddr1 from the flash memory 502 into the volatile memory 510.

Next, the host 506 requests to access the data of the host logical address HAddr2. According to an index value, Index2, formed by the bits in the section 706 of HAddr2, the microprocessor 508 looks up the pointer table PT1 already stored in the volatile memory 510 and thereby a physical address is obtained from the pointer table PT1. Based on the obtained physical address, the microprocessor 508 loads the sub-mapping table L2P_GforAddr2 from the flash memory 502 into the volatile memory 510.

Next, the host 506 requests to access the data of the host logical address HAddr3. The microprocessor 508 looks up the pointer table PT2 already stored in the volatile memory 510 according to an index value, Index5, formed by the bits in the section 704 of HAddr3, and thereby obtains a physical address from the pointer table PT2. According to the obtained physical address, the microprocessor 508 loads the pointer table PT3 from the flash memory 502 into the volatile memory 510. According to an index value, Index 1, formed by the bits within the section 706 of HAddr3, the microprocessor 508 looks up the pointer table PT3 and thereby obtains a physical address. Based on the obtained physical address, the microprocessor 508 loads the sub-mapping table L2P_GforAddr3 from the flash memory 502 into the volatile memory 510.

As shown, there is no need to use a large volatile memory 510 to load the required sub-mapping table (L2P_GforHAddr1, L2P_GforHAddr2, or L2P_GforHAddr3).

It is not intended to limit the structure of the memory controller 504 that operates the flash memory 502. Any design based on the forgoing hierarchical mapping information management technique should be regarded as within the scope of the present invention. In some exemplary embodiments, non-volatile memory control methods based on the forgoing hierarchical mapping table management are shown.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, coupling a host to the non-volatile memory, and having a microprocessor, wherein:
when the host requests to access data of a first logical address, the microprocessor loads a first sub-mapping table from the non-volatile memory to a volatile memory;
the microprocessor loads hierarchical pointer tables related to the first logical address into the volatile memory;
among the hierarchical pointer tables, each higher-level pointer table lists non-volatile memory physical addresses of lower-level pointer tables;
a non-volatile memory physical address of the first sub-mapping table is obtained from a first pointer table according to a first index, for the microprocessor to load the first sub-mapping table from the non-volatile memory into the volatile memory for mapping information of the first logical address, and the first pointer table is in the lowest level among the hierarchical pointer tables loaded in the volatile memory;
the first logical address is represented in a logical address format;
the hierarchical pointer tables in different levels are looked up according to different sections of predetermined most significant bits of the logical address format, and the first sub-mapping table is looked up according to predetermined least significant bits of the logical address format; and
the microprocessor records values represented in the different sections of the predetermined most significant bits of the first logical address as history search records in the volatile memory, for identification of the first sub-mapping table that has been loaded into the volatile memory, wherein the history search records are in a hierarchical structure corresponding to the hierarchical pointer tables and, according to the history search records, the microcontroller skips redundant table download.

2. The data storage device as claimed in claim 1, wherein:
when the host requests to access data of a second logical address related to a second sub-mapping table and a non-volatile memory physical address of the second sub-mapping table is stored in the first pointer table as indicated by a second index, the microprocessor looks up the first pointer table according to the second index to obtain the non-volatile memory physical address of the second sub-mapping table and, accordingly, loads the second sub-mapping table from the non-volatile memory into the volatile memory for mapping information of the second logical address.

3. The data storage device as claimed in claim 2, wherein:
a non-volatile memory physical address of the first pointer table is recorded in a second pointer table as indicated by a third index;
when the host requests to access data of a third logical address related to a third sub-mapping table, a non-volatile memory physical address of the third sub-mapping table is stored in a third pointer table as indicated by a fourth index, and a non-volatile memory physical address of the third pointer table is stored in the second pointer table as indicated by a fifth index, the microprocessor looks up the second pointer table loaded in the volatile memory according to the fifth index to obtain the non-volatile memory physical address of the third pointer table, loads the third pointer table from the non-volatile memory into the volatile memory, looks up the third pointer table loaded in the volatile memory according to the fourth index, and obtains the non-volatile memory physical address of the third sub-mapping table to load the third sub-mapping table from the non-volatile memory into the volatile memory for mapping information of the third logical address.

4. The data storage device as claimed in claim 3, wherein:
during the power-up of the data storage device, the microprocessor loads a fourth pointer table from the non-volatile memory into the volatile memory and then the fourth pointer table resides in the volatile memory; and
the fourth pointer table is in the highest level among the hierarchical pointer tables.

5. The data storage device as claimed in claim 4, wherein:
the second logical address and the third logical address are represented in the logical address format;
an index to look up the fourth pointer table is formed by bits in a first section of the logical address format;
an index to look up the second pointer table is formed by bits in a second section of the logical address format;
an index to look up the first pointer table or the third pointer table is formed by bits in a third section of the logical address format; and
an index to look up the first sub-mapping table, the second sub-mapping table, or the third sub-mapping table is formed by bits in a fourth section of the logical address format.

6. The data storage device as claimed in claim 5, wherein:
the microprocessor uses current values represented in the first section, the second section, and the third section of the logical address format to update the history search records in the volatile memory, for identification of a sub-mapping table loaded into the volatile memory.

7. A non-volatile memory control method, comprising:
when a host requests to access data of a first logical address, loading a first sub-mapping table from a non-volatile memory to a volatile memory; and
loading hierarchical pointer tables related to the first logical address into the volatile memory,
wherein:
among the hierarchical pointer tables, each higher-level pointer table lists non-volatile memory physical addresses of lower-level pointer tables;
a non-volatile memory physical address of the first sub-mapping table is obtained from a first pointer table based on a first index and, accordingly, the first sub-mapping table is loaded from the non-volatile memory into the volatile memory for mapping information of the first logical address;
the first pointer table is in the lowest level among the hierarchical pointer tables loaded in the volatile memory;
the first logical address is represented in a logical address format;
the hierarchical pointer tables in different levels are looked up according to different sections of predetermined most significant bits of the logical address format, and the first sub-mapping table is looked up according to predetermined least significant bits of the logical address format; and
values represented in the different sections of the predetermined most significant bits of the first logical address are recorded as history search records in the volatile memory, for identification of the first sub-mapping table that has been loaded into the volatile memory, wherein the history search records are in a hierarchical structure corresponding to the hierarchical pointer tables and, according to the history search records, redundant table download is skipped.

8. The non-volatile memory control method as claimed in claim 7, further comprising:
when the host requests to access data of a second logical address related to a second sub-mapping table and a non-volatile memory physical address of the second sub-mapping table is stored in the first pointer table as indicated by a second index, looking up the first pointer table according to the second index to obtain the non-volatile memory physical address of the second sub-mapping table and, accordingly, loading the second sub-mapping table from the non-volatile memory into the volatile memory for mapping information of the second logical address.

9. The non-volatile memory control method as claimed in claim 8, further comprising:
when a non-volatile memory physical address of the first pointer table is recorded in a second pointer table as indicated by a third index, the host requests to access data of a third logical address related to a third sub-mapping table, a non-volatile memory physical address of the third sub-mapping table is stored in a third pointer table as indicated by a fourth index, and a non-volatile memory physical address of the third pointer table is stored in the second pointer table as indicated by a fifth index, looking up the second pointer table loaded in the volatile memory according to the fifth index to obtain the non-volatile memory physical address of the third pointer table, loading the third pointer table from the non-volatile memory into the volatile memory, looking up the third pointer table loaded in the volatile memory according to the fourth index, and obtaining the non-volatile memory physical address of the third sub-mapping table to load the third sub-mapping table from the non-volatile memory into the volatile memory for mapping information of the third logical address.

10. The non-volatile memory control method as claimed in claim 9, further comprising:
during the power-up of a data storage device, loading a fourth pointer table from the non-volatile memory into the volatile memory and thereby the fourth pointer table resides in the volatile memory,
wherein the fourth pointer table is in the highest level among the hierarchical pointer tables.

11. The non-volatile memory control method as claimed in claim 10, wherein:
the second logical address and the third logical address are represented in the logical address format;
an index to look up the fourth pointer table is formed by bits in a first section of the logical address format;
an index to look up the second pointer table is formed by bits in a second section of the logical address format;
an index to look up the first pointer table or the third pointer table is formed by bits in a third section of the logical address format; and
an index to look up the first sub-mapping table, the second sub-mapping table, or the third sub-mapping table is formed by bits in a fourth section of the logical address format.

12. The non-volatile memory control method as claimed in claim 11, further comprising:
using current values represented in the first section, the second section, and the third section of the logical address format to update the history search records in the volatile memory, for identification of a sub-mapping table loaded into the volatile memory.

* * * * *